UNITED STATES PATENT OFFICE.

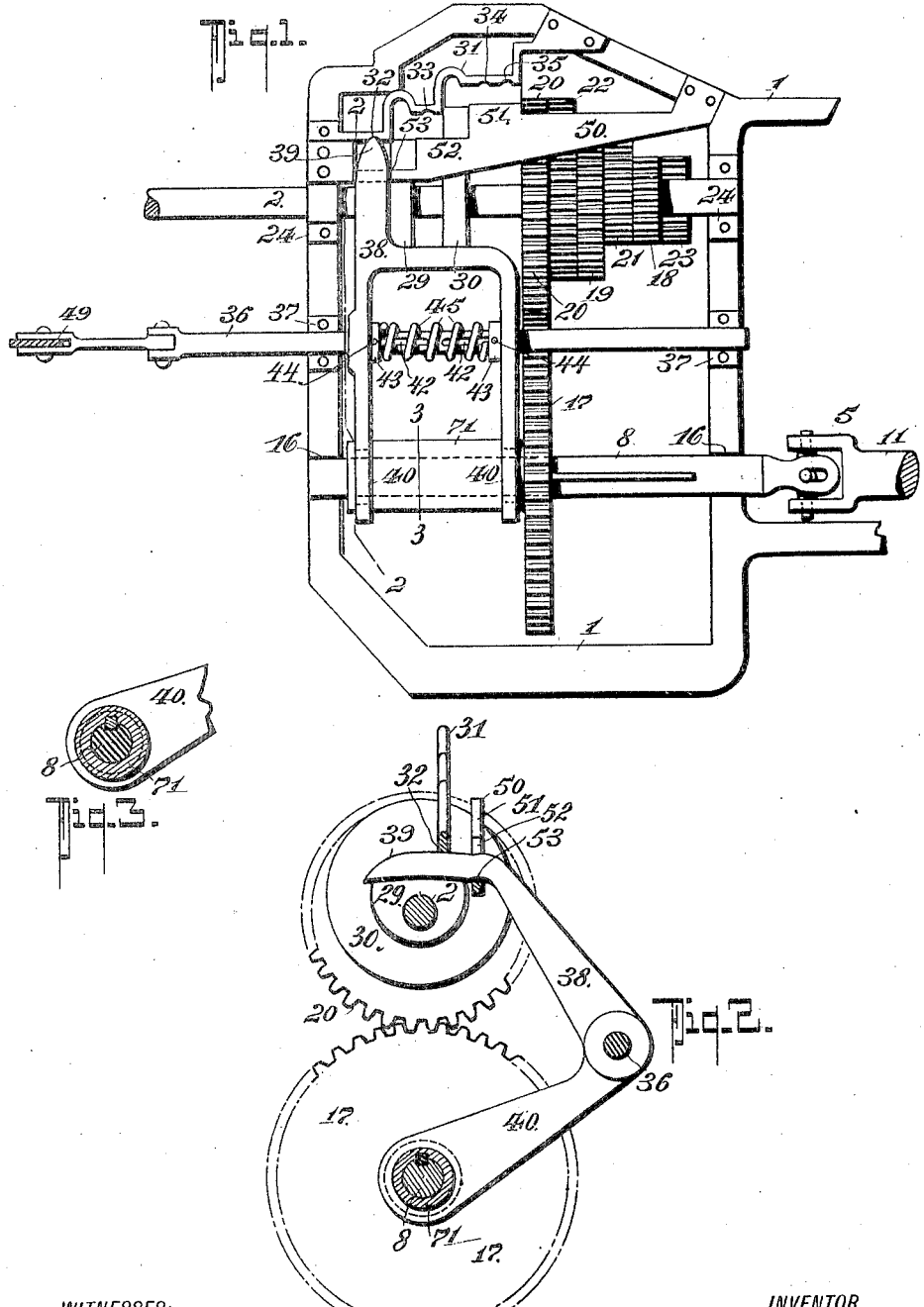

HARRY BEAUREGARD ROSS, OF DENVER, COLORADO, ASSIGNOR TO THE ROSS TRANSMISSION GEAR COMPANY, OF DENVER, COLORADO, A CORPORATION OF COLORADO.

POWER-TRANSMISSION MECHANISM.

1,087,891.  Specification of Letters Patent.  Patented Feb. 17, 1914.

Original application filed May 17, 1912, Serial No. 697,862. Divided and this application filed August 7, 1912, Serial No. 713,799. Renewed July 18, 1913. Serial No. 779,873.

*To all whom it may concern:*

Be it known that I, HARRY BEAUREGARD Ross, a citizen of the United States, residing at Denver, county of Denver, and State of Colorado, have invented certain new and useful Improvements in Power-Transmission Mechanism, of which the following is a specification.

My invention relates to improvements in power transmission mechanism and has particular reference to that type of transmission mechanism in which a single or master gear coöperates with a pyramid or series of alternately arranged concentric and eccentric speed-changing gears.

This invention is a modification of and a divisional part of the invention disclosed in my copending application, Serial No. 697,862, filed May 17, 1912.

The general object of my invention is to provide an improved means of holding the single or master gear in working engagement with the concentric gears and in engagement with the eccentric gears when the master gear is shifted from one concentric gear to another.

A further object of my invention is to provide mechanism wherewith the single or master gear can be supported in working engagement with the concentric gears of a series of change speed gears in a rigid manner, and wherewith the friction incident to the operation of the mechanism may be greatly diminished.

My invention consists generally in a transmission mechanism comprising a shaft carrying a plurality of alternately arranged concentric and eccentric gears, another shaft carrying or carried with a single or master gear, spaced eccentric cams on the shaft carrying the concentric and eccentric gears for moving the master gear toward the shaft, and other means separate from the gear shaft for holding the master gear in working engagement with the concentric gears.

My invention consists further in transmission mechanism comprising a shaft carrying a plurality of alternately arranged concentric and eccentric gears and spaced eccentric cams, another shaft carrying a master gear for coöperation with the concentric and eccentric gears, mechanism arranged to engage the eccentric cams for moving the master gear toward the plurality of gears, means for shifting the master gear moving mechanism longitudinally, and means spaced from the gear-carrying shaft for supporting said mechanism to hold the master gear in working engagement with the aforementioned concentric gears.

My invention consists further in the unique arrangement, construction, and combination of parts whereby these objects named above and others which will appear hereinafter are attained.

My invention will be more readily understood by reference to the accompanying drawings, which illustrate one form thereof, and in which:

Figure 1 is a view of my transmission mechanism embodying my invention, certain of the parts being removed better to disclose the interior operating parts; Fig. 2 is a cross section taken substantially on the line 2—2 of Fig. 1; and Fig. 3 is a detail section on the line 3—3 of Fig. 1.

For certain purposes it is desirable positively to support the master gear by means other than the rotating cams upon the shaft carrying the pyramid of gears. Such a construction furnishes a simpler mechanism in some respects and also eliminates the friction due to engagement of the master gear supporting mechanism with constantly rotating cams and also supplies a more rigid support therefor. I shall now describe my unique mechanism for accomplishing this result.

Referring now to the drawings, 1 represents the transmission casing or frame in which a shaft 2 is rotatably mounted in suitable bearings 24. This shaft may be driven either directly or indirectly from the source of power. Arranged in another part of the casing is a shaft 8, which is mounted in bearing slots 16 in the frame 1, and it is connected by a universal joint 5 with the shaft 11 leading to the driving axle or jack shaft (not shown). On the shaft 2 I arrange a number of spaced concentric gears 20, 19, and 18, to rotate therewith, and between them I place concentric gears 22 and 21. Adjacent to the shaft 2 is a reversing gear 23. On the shaft 8 I arrange a master gear 17 for longitudinal movement thereon, for engagement with the gears on the shaft 2, and also the reversing gear 23. The speed of the shaft 8 obviously is determined by which of the gears of the pyramid the master gear 17 engages, and hence I provide means for moving the gear 17 into engagement with the desired gear, and for properly holding it in such position. For this purpose I affix spaced eccentric cams or disks 29 and 30 on the shaft 2, the purpose of which is to keep the gear 17 in engagement with the eccentric gears 22 and 21 in the transition of the master gear from one concentric gear to another. For shifting the gear 17 longitudinally, I provide a shaft 36 which is longitudinally movable in bearings 37, and which can be moved in either direction by means of a lever 49, and on the shaft 36 I mount mechanism whereby movement of the shaft 36 will at the desired time shift the gear 17 longitudinally. This mechanism obviously may assume various forms, but I prefer to provide a bell-crank-like member 38 having a bifurcated end forming arms, 40, and a single arm portion 39 for engagement with the eccentric cams 29 and 30. Between the arms 40, the shifting rod 36 is slotted or grooved, as shown at 42, and collars 43 are provided which may shift along the rod 36 within the limits of the slots 42. Pins 44 carried by the collars 43 enter the slots and serve to limit the movement. Between the collars 43 I arrange a compression spring 45, and it is by means of this spring that the desired force is applied to shift the member 38 and the gear 17 therewith, as will be pointed out more fully. This method of shifting the gear is merely one example of a convenient way to impart motion to the gear and I do not, of course, limit myself to that particular mechanism. Between the arms 40 I arrange a sleeve 71, which is feathered to the shaft 8, and which has an extended portion carrying the gear 17. Hence any movement of the member 38 causes the corresponding movement of the gear 17.

It is desirable to provide means which allows the storing of considerable energy before the member 38 can be shifted so that it will move very rapidly when released, and means which also serve to prevent accidental movement of the gear 17. For this purpose a device 31 may be employed which has notches 32, 33, 34, and 35 to coöperate with the latching portion 39 of the member 38. The notches are quite shallow and when the spring 45 is put under a predetermined compression, it is sufficient to release the portion 39 from the notch with which it coacts.

The cams 29 and 30 serve to maintain the gear 17 in engagement with the eccentric gears 22 and 21, and obviously some means must be provided for holding the gear 17 in working engagement with the concentric gears. In some forms of my invention this means consists of means which constantly ride on concentric cams arranged on the shaft alternately spaced with eccentric cams. I have here provided unique means whereby it is possible to support the master gear in working engagement with the concentric gears without constantly engaging rotating cams. This means may be made in different forms and positions in the gear casing, but preferably comprises a stepped cam-like device adapted to support the master gear carrying means in a number of different positions. This may be accomplished in a simple manner by a bar 50 suitably mounted in the casing, and forming therein step portions 51, 52 and 53 to coöperate with the end portion 39 of the gear carrying member 38. As is clearly shown in Fig. 2, this bar supports the member 38 and thereby rigidly holds the gear 17 in mesh with the concentric gears of the pyramid.

In order that the operation of the invention may be clearly understood, I shall state briefly the general movements thereof. Assuming the parts to be positioned, as shown in Fig. 1 of the drawings, and that it is desired to shift the gear 17 from engagement with the concentric gear 20 to engagement with the concentric gear 19, the operator moves the lever 49 in a direction to move the rod 36 from left to right, thereby compressing the spring 45 to apply a force tending to move the member 38 to the right. So soon as the eccentric disk or cam 29 presents its smallest diameter in alinement with the portion 39 of the member 38, the force of the spring 45 acts to shift the member 38 until the gear 17 alines with the eccentric gear 22 at which time the end portion 39 rests upon the eccentric disk 29. By means of the eccentric cam 29 and the bell crank 28 the gear 17 is maintained in engagement with the eccentric gear 22 until the minimum diameter thereof is reached. This movement of the member 38 by the cam 29 also raises the end portion 39 into alinement with the next higher cam step 52 of the member 50, and so soon as this occurs the remaining stored energy in the spring 45 imparts further movement to the member 38, thereby moving the gear 17 into engagement with the concentric gear 19. The gear is maintained in this position by the end portion 39 of the member 38 engaging the step 52 of the cam bar 50. Of course, at this time the spring 45 has again balanced itself and no longer tends to move the member 38. The shifting movement of the gear to and from the other gears of the gear pyramid, is accomplished in substantially the same manner.

From the foregoing description considered in connection with the accompanying drawings, it is thought that the complete construction, operation and advantages of my invention will be readily apparent to those skilled in the art to which it relates.

Since this disclosure will readily suggest to others skilled in the art different modified structures whereby the substantial objects of my invention may be accomplished, I do not wish to be limited to the specific structure herein shown and described.

What I claim is:

1. In a transmission gear mechanism, a driving shaft, a plurality of gears of different diameters on said driving shaft, a second shaft, a gear shiftably mounted on said second shaft to be movable along the same, a shifting rod, a bell crank lever fulcrumed on said shifting rod and connectible with said shiftable gear to move bodily with the same, means for shifting said bell crank lever to shift said shiftable gear into the planes of said driving shaft gears respectively, and means coöperative with said bell crank lever for maintaining said shiftable gear in mesh with said driving shaft gears, said driving shaft gears including alternately arranged concentric and eccentric gears, and said last named bell crank coöperating means including a device for holding said bell crank to maintain said shiftable gear in mesh with said concentric driving shaft gears, and also including means on said driving shaft for engaging said bell crank lever when said shiftable gear is in the planes of said eccentric gears to maintain said shiftable gear in mesh with said eccentric gears, said device comprising a fixed bar having projections to engage said bell crank lever when said shiftable gear is in mesh with said concentric driving shaft gears.

2. In a transmission gear mechanism, a driving shaft, a plurality of gears on said shaft, a second shaft, a gear on said second shaft and slidable along the same to mesh with the various gears of the driving shaft, a bell crank shifting lever connected and shiftable with said shiftable gear and a stepped bar for engaging said bell crank lever to hold said shiftable gear in mesh with said driving shaft gears.

3. In a transmission gear mechanism, a driving shaft, a plurality of gears on said shaft, a second shaft, a gear on said second shaft and slidable along the same to mesh with the various gears of the driving shaft, a bell crank shifting lever connected and shiftable with said shiftable gear and a stepped bar for engaging said bell crank lever to hold said shiftable gear in mesh with said driving shaft gears, other gears on said driving shaft intermediate said first mentioned gears and disks on said driving shaft coöperatve with said bell crank lever for retaining said bell crank lever in mesh with said other gears.

4. In a transmission gear mechanism, a driving shaft and a second shaft, a set of alternately disposed concentric and eccentric gears on said driven shaft, a shiftable gear on said second shaft for successively meshing with said driving shaft gears, a shiftable rod, a bell crank lever pivoted on said rod and coöperatively connected with said second shaft, and means for holding said bell crank lever in its position to retain said shiftable gear in mesh with the said respective driving shaft gears, said means including devices on the driving shaft and a fixed stepped bar coöperatng with said devices, and means for bodily shifting said bell crank to move said shiftable gear into the respective planes of the driving shaft gears.

5. In a transmission gear mechanism, the combination of a shaft, a plurality of change speed gears mounted thereon, another shaft, a single gear mounted thereon for coöperation with the change speed gears, a plurality of cams on one of the shafts, means engaging the cams for moving the single gear toward the change speed gears, and other means spaced from the shafts for holding the single gear in working engagement with any selected one of the change speed gears.

6. In a transmission gear mechanism, the combination of a shaft, a plurality of alternately arranged concentric and eccentric gears mounted thereon, another shaft, a master gear mounted thereon for coöperation with said concentric and eccentric gears, spaced eccentric cams, means engaging the eccentric cams for moving the master gear toward the change speed gears, and other means spaced from the shaft and operable to hold the master gear in working engagement with the said concentric gears.

7. In a transmission gear mechanism, the combination of a shaft, a plurality of alternately arranged concentric and eccentric gears and spaced eccentric cams mounted thereon, another shaft, a master gear mounted thereon for coöperation with said concentric and eccentric gears, mechanism engaging the eccentric cams for moving the master gear toward the eccentric gears, and stepped means separate from the gear shafts for supporting the master gear in working engagement with the concentric gears.

8. In transmission gear mechanism, the combination of a shaft, a plurality of alternately arranged concentric and eccentric gears and spaced eccentric cams mounted thereon, another shaft, a master gear mounted thereon and arranged for coöperation with said concentric and eccentric gears, mechanism arranged to engage the eccentric cams for moving the master gear toward the shaft carrying the concentric and eccentric gears, means for moving said mechanism and master gear longitudinally, and means spaced from the shafts for engaging said mechanism and thereby supporting the master gear in working engagement with the aforesaid concentric gears.

9. In a transmission gear mechanism, the combination of a shaft, a plurality of alternately arranged concentric and eccentric gears and spaced eccentric cams mounted thereon, another shaft, a master gear mounted thereon for coöperation with said concentric and eccentric gears, step-like mechanism coacting with the mechanism carrying the master gear and adapted to support the master gear in working engagement with the aforesaid concentric gears, said eccentric cams coacting with said master gear carrying mechanism for maintaining the master gear in engagement with said eccentric cams during the shifting operation.

HARRY BEAUREGARD ROSS.

Witnesses:
H. BYNE NORTHROP,
WINFIELD DAVIS.